July 4, 1950  A. J. MORWAY  2,514,331
STABILIZED LUBRICATING GREASE
Filed June 24, 1948
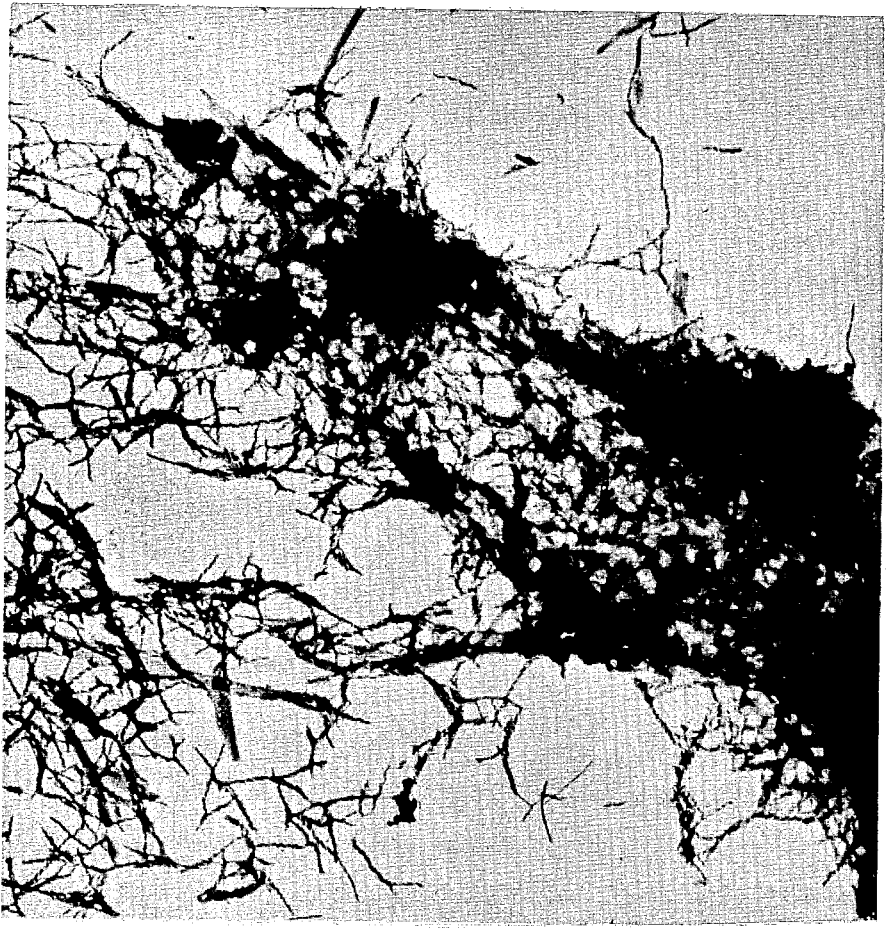
Arnold J. Morway Inventor
By Edwin M. Thomas Attorney Patented July 4, 1950

2,514,331

UNITED STATES PATENT OFFICE 2,514,331

STABILIZED LUBRICATING GREASE

Arnold J. Morway, Clark Township, Union County, N. J., assignor to Standard Oil Development Company, a corporation of Delaware Application June 24, 1948, Serial No. 35,023

9 Claims. (Cl. 252—21)

This invention relates to a stabilized lubricating grease and more particularly to a stabilized calcium soap base grease and the method of producing it. The invention relates especially to a composition which remains stable at high temperatures even after structural water is boiled away.

Calcium base greases, commonly referred to as lime soap greases, have generally been prepared in the past by reacting hydrated lime ($Ca(OH)_2$) with fat or fatty acids by heating, usually in the presence of some mineral oil, to an elevated temperature, for example about 300° F. Thereafter while the mixture is cooling but before the soap begins to precipitate out of the mineral oil (usually around 210°–220° F.) water is added to stabilize the mixture. While the exact mechanism is not known it appears that the water reacts with the soap to form long crystals or other particles which remain dispersed in the mineral oil as a fibrous type of structure. On addition of more oil and further cooling, a stable gel or grease-like structure is formed, due apparently to the three-dimensional fibrous mass of the soap apparently produced by water addition.

If a conventional grease, that is a mineral oil thickened to a grease-like consistency with lime soap, is heated above the boiling point of water for an appreciable period of time, the water is removed from the structure described above and the structure breaks down, the soap being precipitated out of the mineral oil. After such breaking down obviously the mixture is not a satisfactory grease. The present invention is based upon the discovery that a calcium grease structure may be made stable above the boiling point of water by addition thereto of an extremely finely divided silica having colloidal properties. Suitable silica for this purpose is a condensed silica such as may be formed by the burning of an organic silicate, for example, ethyl silicate or related inflammable and volatile silicates such as other lower hydrocarbon silicates. Other organo-silicon materials may likewise be used provided they are combustible. In the combustion the "smoke" or vapors of combustion are condensed on a cold surface in a manner similar to that employed in the commercial production of carbon black from natural gas. The ash so formed is collected in the form of a very fine powder which appears superficially to be substantially amorphous. Actually the material has a structure which appears to be made up of chains of particles but the particles are extremely small, preferably being of the order of 5 to 50 millimicrons, average diameter. For the purposes of this invention the particle size should not in any case exceed an average of about 100 millimicrons.

Finely divided silica of a particle size below roughly 100 millimicrons itself has excellent grease-forming properties due to its apparently elongated or chain-like structure and its high oil absorbing properties. In this respect silica, particularly condensed silica formed by burning inflammable organic silicates like ethyl silicate, has an extremely large surface area, being similar in this respect to acetylene carbon black, that is carbon black obtained by the incomplete combustion of acetylene. As a matter of fact, electron photomicrographs of greases prepared with this material show the silica formation to be somewhat similar to that of acetylene black which is known also to be an excellent grease thickener. However, greases prepared from condensed silica alone, though useful for some purposes, are readily washed off metallic surfaces by water, due apparently to preferential wetting of the silica. Hence they are not satisfactory per se for use in the presence of water.

According to the present invention, condensed silica may be combined with lime soap to produce a superior lubricating grease which is free from the disadvantages associated with either single thickening agent when used alone. The water solubility of silica base grease is corrected by the addition of lime soap and, on the other hand, a firmer grease and superior high temperature properties may be secured in a lime soap grease by addition of condensed silica to the lime soap. Thus a greater yield, that is a grease of harder consistency with a given soap content, may be obtained from lime soap by adding thereto the finely divided silica.

The addition of condensed silica to lime soap greases improves their stability at high temperature but its use is not limited to greases of the calcium base type. It may be used also in mixed base or soda soap base greases. It is particularly desirable in very hard or so-called "block" greases since it appears to exercise good control over the gradual delivery of oil from the grease block to the mechanism to be lubricated.

Hence according to the present invention, a lubricating grease of excellent stability may be prepared by adding to a suitable lubricating oil, preferably a mineral base oil, a minor proportion, for example from 3 to 40% by weight, based on the finished composition, of a thickener composed both of finely divided silica and a metal soap of fats or fatty acids. More particularly the present invention is based on the use of 3–40% by weight of soap combined with condensed silica, silica ash, or silica from any source having an average particle size of not more than 100 millimicrons. The chain like structure referred to above is desirable and appears commonly to be inherent in these materials. In some cases such structure is not essential since the calcium soap provides a sufficient fibrous structure or body. While various soaps may be used, those prepared by reacting calcium hydroxide or other alkaline earth hydroxide, or oxide, or any alkaline earth metal base with fats or fatty acids having 10–24 carbon atoms are preferred. A preferred range will include 60–97% of lubricating oil, 0.2 to 10% of finely divided silica, that is silica having an average particle size below 100 millimicrons, and 2.8 to about 40% of soap or mixture of soaps of fats or fatty acids.

The lubricating oil may be chosen to suit the particular function but commonly it will be a mineral base oil having a viscosity of at least 50 S. S. U. at 100° F. and not more than 1000 S. S. U., preferably not more than 700 S. S. U., at 210° F. By mineral base oil is meant an oil of petroleum origin which may, however, contain minor proportions of vegetable or animal oils and also may contain small amounts of conventional modifiers such as anti-oxidants, corrosion inhibitors, tackiness agents, load carrying agents, viscosity index improvers, thickeners and the like.

Specific examples of the present invention will next be given.

EXAMPLE 1

A composition was prepared consisting of 10% by weight of lime soap of animal fat (such as beef, mutton or lard fat), 5% condensed silica prepared by burning an organic silicate (ethyl silicate) and condensing its vapors on a cold surface, 1% water and 84% of a Coastal type mineral oil having a viscosity of about 300 S. S. U. at 100° F.

In the foregoing example the soap was prepared by heating the fat and the lime together in the presence of part of the mineral oil, heating being carried out at a temperature of the order of 300° F. Upon cooling to about 210° F. the water was added and immediately thereafter the condensed silica was added, being worked into the grease. The composition was withdrawn from the kettle when it had cooled to 195° F. and placed in containers. It had an unworked penetration of 265, measured by the ASTM method and a worked penetration of 270.

EXAMPLE 2

Another grease was prepared by combining 20% by weight of hydrogenated fish oil acid, 3% hydrated lime, 5% condensed silica and 72% of the same mineral oil as in Example 1.

The hydrated lime, condensed silica and half of the mineral oil were charged to a cold grease kettle. The lime and silica were thoroughly dispersed in the mineral oil to form a slurry. In this example the fatty acids and the remainder of the mineral oil were heated to about 120° F. to melt the fatty acids. The latter solution was next added gradually to the lime-silica slurry and the entire mass was stirred for 15 minutes. During this time the temperature rose from 120° to 125° F. and an excellent solid grease structure was formed.

The grease of Example 2 was found to be considerably more stable against oil separation or bleeding than a similar lime soap grease containing no silica. This particular example had an unworked penetration at 77° F. of 200 by the ASTM method and a worked penetration of 210.

In the preparation of greases of this type it has been found that the condensed silica itself contains an appreciable amount of free acid, for example as much as 2.0%, calculated as free oleic acid. Therefore, to prevent the autocatalytic effect of the free acid on oxidation of the grease, it is desirable to provide a small amount of free lime or other saponifying or neutralizing agent over and above that which is necessary to completely neutralize the fats or fatty acids.

The following table gives the results of oxidation tests, using only silica with mineral oil. It will be noted that where a small amount of lime was added to neutralize the acidity of the silica, the oxidation life was greatly increased. A particularly effective combination included also 0.5% of a conventional oxidation inhibitor such as phenyl alpha naphthylamine.

TABLE 1

*Norma Hoffman bomb oxidation tests at 210° F. and 110 p. s. i. initial oxygen pressure*

| Lubricant | No. of Hours for 5 p. s. i. Drop in Pressure |
|---|---|
| 12.5% Condensed silica<br>87.5% Solvent extracted Mid-Continent oil—56 S. U. at 210° F | 38 |
| 12.5% Condensed silica<br>0.5% Hydrated lime<br>87.0% Mineral oil as above | 192 |
| 12.5% Condensed silica<br>87.0% Mineral oil as above<br>0.5% Phenyl alpha naphthylamine | 276 |
| 12.5% Condensed silica<br>0.5% Hydrated lime<br>86.5% Mineral oil as above<br>0.5% Phenyl alpha naphthylamine | 520 |

Although as indicated above a grease of very good structure may be prepared using only the finely divided silica as a thickener, such greases are not satisfactory for use where moisture is present. To determine the relative properties of compositions with and without lime soap, greases containing respectively silica alone, silica with a neutralizing quantity of lime, and silica combined with a conventional lime soap grease, of about 15% lime soap content, were subjected to water washing tests. These tests consisted of packing a Conrad bearing with 4 grams of the greases and rotating it at 600 R. P. M. for one hour while playing a stream of water on the outside housing of the bearing according to the Government specification test method AN–G–15. The results obtained are shown in Table 2.

TABLE 2

*Water washing tests*

| Lubricant | Per Cent Grease Washed Out of Bearing |
|---|---|
| 12% Reinforcing silica<br>87% Solvent extracted Mid-Continent oil, 56 S. S. U. vis. at 210° F | 100 |
| 12% Reinforcing silica<br>87% Mineral oil as above<br>0.5% Hydrated lime | 100 |
| 10% Reinforcing silica<br>13.5% Lime soap<br>76.5% Mineral oil as above | 0–5 |

The compositions of the above character appear to have particular utility in the lubrication of certain elements of textile machinery where a light colored non-staining lubricant is desired, for example as in twister ring lubricants. In the manufacture of cordage for use in automobile tires and the like the guide rings for the threads are subject to severe wear unless they are lubricated suitably and the selection of a suitable lubricant has been difficult in the past. White petrolatum has commonly been used but it has a low melting point (approximately 105° F. or lower when it has a desired consistency) and is not satisfactory when operating temperatures or ambient temperatures are moderately high. According to the present invention, it has been discovered that 5% by weight of reinforcing silica, that is finely divided silica of the type used in rubber compounding, having the general properties described above, the petrolatum is still clear and white but its melting point is raised to about 170° F. At a twister ring operating temperature of 150° F. the material retains excellent grease-like structure and the added silica does not cause the petrolatum to harden. A standard lubricating petrolatum of the prior art which had an ASTM penetration of 280 (using the 150 gram cone) had its penetration lowered only to 265 to 270 by the addition of about 5% of the reinforcing silica. The proportions of silica employed with petrolatum may be as little as 2% or as much as about 15% by weight, though about 5% appeared to be preferable.

Hence for uses where moisture is not encountered the silica itself is a satisfactory thickener for certain special greases and the soap need not be employed under such circumstances. For most uses, however, the combination of soap and silica is preferred. The calcium soaps and the related alkaline earth metal soaps are normally preferred because of their water resistant properties but sodium, lithium and the other alkali metal soaps may also be used or may be mixed with alkaline earth metal soaps as indicated above.

EXAMPLE 3

Greases prepared by simply stirring silica, such as reinforcing silica, into oil have a good grease structure and a firm consistency before they are worked. Slight working, however, causes them to become practically fluid. Thus a grease prepared by mixing 12% of reinforcing silica with 88% of mineral oil of 56 S. S. U. viscosity at 210° F. had an unworked penetration of 285 millimeters/10. On working, however, the grease became practically fluid although it soon regained its original consistency. By the addition of about 10% of a preformed lime soap grease containing 18% of lime soap the original silica thickened grease retained its original consistency upon working. The final product containing approximately 11% silica and 1.6% calcium soap had a melting point or dropping point above 400° F. The effect of water on the grease in washing out or preferentially wetting the silica was materially reduced by the addition of even this small amount of calcium soap, although washing was not eliminated. As a matter of fact, 45% of the grease was washed out in the rather severe water washing test as compared with about 100% which was washed out in the absence of the lime soap. The lime soap content of such a composition should be more than 1% and may be as much as 40%. The silica content as previously indicated may be as low as 0.2%, but where the soap content is very low, the silica should be increased substantially up to as much as 15%. In such cases it should be at least 2%.

The attached drawing was prepared from an electron photomicrograph showing the structure of calcium soap fibers, as modified by condensed silica in a lubricating grease. The twisted cord-like elements represent the normal calcium soap structure with water incorporated therein. The dark areas indicate concentrations of the silica. This photograph, which shows a magnification of approximately 100,000, makes it appear that the deposits of silica are substantial, but in reality they are extremely small and close together and are sufficient to prevent breakdown of the soap structure. At the same time the calcium soap appears to protect the silica from preferential wetting when moisture is present. The twisted thread-like character of the lime soap particles is an interesting phenomenon. Apparently continuous coverage of the calcium soap fibers with the silica or continuous combination of the two in extremely fine detail is not necessary to obtain the advantages of this invention.

What is claimed is:

1. A substantially solid grease type lubricating composition consisting essentially of a mineral base lubricant of grease consistency, said lubricant containing 0.2 to 15% by weight, based on the total composition of finely divided silica having an average particle size of not more than 100 millimicrons, said composition including 2.8 to 40% of alkaline earth metal soap and having water resistant properties.

2. A lubricating grease consisting essentially of lubricating oil thickened to a grease-like consistency with 0.2 to 10% by weight, based on the final composition, of fine silica having an average particle size of not greater than 100 millimicrons combined with about 2.8 to 40% of a soap of alkaline earth metal and $C_{10}$ to $C_{24}$ fatty acid to render said grease water resistant.

3. A lubricating grease consisting essentially of lubricating oil thickened to a grease-like consistency with 0.2 to 10% by weight, based on the total composition, of silica ash having an average particle size of not more than 100 millimicrons combined with about 2.8 to 40% calcium soap of $C_{10}$ to $C_{24}$ fatty acids to substantially moisture proof said grease.

4. A lubricating grease composition consisting essentially of 60 to 97% by weight of mineral base lubricating oil having a viscosity between 50 S. S. U. at 100° F., and 1000 S. S. U. at 210° F., 0.2 at 10% of silica having an average particle size of less than 100 millimicrons and 2.8 to 40% of an alkaline earth metal salt of fatty acid having 10 to 24 carbon atoms per molecule.

5. A composition consisting essentially of a major proportion of mineral base lubricating oil, 0.2 to 10% by weight of finely divided silica having an average particle size of less than 100 millimicrons and 2.8 to 40% of calcium soap, said composition containing sufficient calcium base to substantially neutralize the acidity of said silica.

6. A composition consisting essentially of 60 to 97% by weight of mineral base lubricating oil of 40 to 200 S. S. U., viscosity at 210° F., 0.2 to 10% silica ash of rubber reinforcing grade, having an average particle size of less than 100 millimicrons, 3 to 40% calcium soap, and 0 to 1.0% of an anti-oxidant.

7. A composition consisting essentially of a solid grease type petroleum base lubricant and 2 to 15% by weight based on the finished composition, of finely divided silica having an average particle size of less than 100 millimicrons.

8. Composition as is in claim 7 wherein said petroleum base lubricant is petrolatum.

9. Composition as in claim 7 wherein said petroleum base lubricant is mineral oil containing as a grease forming ingredient about 2.8 to 40% of lime soap.

ARNOLD J. MORWAY.

REFERENCES CITED

The following references are of record in the file of this patent:

UNITED STATES PATENTS

| Number | Name | Date |
| --- | --- | --- |
| 1,362,161 | Wheelock | Dec. 14, 1920 |
| 2,112,632 | Montgomery | Mar. 29, 1938 |
| 2,260,625 | Kistler | Oct. 28, 1941 |
| 2,445,901 | Ambrose | July 27, 1948 |